United States Patent [19]

Hoffmann et al.

[11] Patent Number: 5,162,052
[45] Date of Patent: Nov. 10, 1992

[54] DEVICE FOR THE RELEASE OF SYSTEMIC ACTIVE SUBSTANCES TO PLANTS AND THE USE THEREOF

[75] Inventors: Hans-Rainer Hoffmann; Jürgen Maass; Walter Müleer; Michael Roreger, all of Neuwied, Fed. Rep. of Germany

[73] Assignee: LTS Lohmann Therapie-Systeme GmbH & Co. KG, Neuwied, Fed. Rep. of Germany

[21] Appl. No.: 546,475

[22] Filed: Jun. 29, 1990

[30] Foreign Application Priority Data

Jul. 7, 1989 [DE] Fed. Rep. of Germany ....... 3922366

[51] Int. Cl.⁵ .............................................. A01G 17/00
[52] U.S. Cl. .............................................. 47/8; 47/24; 47/48.5
[58] Field of Search .............................. 47/24, 8, 48.5

[56] References Cited

U.S. PATENT DOCUMENTS

| | | | |
|---|---|---|---|
| 2,143,043 | 1/1939 | Wexler | 47/24 X |
| 2,389,870 | 11/1945 | Reevely | 47/24 X |
| 2,947,111 | 8/1960 | Zobrist | 47/24 X |
| 3,857,934 | 12/1974 | Bernstein | 47/24 X |

FOREIGN PATENT DOCUMENTS

| | | | |
|---|---|---|---|
| 907739 | 3/1946 | France | 47/24 |
| 0200454 | 5/1983 | German Democratic Rep. | 47/24 |
| 0040145 | 3/1979 | Japan | 97/8 |
| 87419 | 3/1956 | Norway | 47/24 |

OTHER PUBLICATIONS

H. Kating & S. Breckle, "Pharmaseutische Bilogie I" Thieme Verlag Stuttgart 1978 pp. 180–189, 204–205.
Muller, Phytopharmalogie, Stuttgart 1986 pp. 38–39, 66–67.

Primary Examiner—David A. Scherbel
Assistant Examiner—Joanne C. Downs
Attorney, Agent, or Firm—Sprung Horn Kramer & Woods

[57] ABSTRACT

The present invention relates to a device for the release of systemic active substances to plants consisting of a backing layer and an active substance reservoir, which device is characterized in that the active substance reservoir is deformable and adaptable to uneven surfaces and that it is suitable for releasing active substances through surfaces of plants consisting of secondary, hardened superficial tissues not being covered by a cuticula.

13 Claims, 1 Drawing Sheet

DEVICE FOR THE RELEASE OF SYSTEMIC ACTIVE SUBSTANCES TO PLANTS AND THE USE THEREOF

The present invention relates to a device for the controlled release of systemic active substances to plants via plant surfaces with secondary superficial tissue.

It is known that numerous active substances are taken up by plants via the leaves and roots and are distributed within the plant systemically. These active substances may, for example, serve to protect the plant from pathogenic agents and pests, or to treat the plant which has already been infected or infested, and also to control growth.

In order to extend the efficiency of these substances, formulations and forms of administration have been developed which release the active substance in a delayed or controlled manner.

The formulations are either sprayed onto the plants or are inserted into the soil adjacent to the roots. The disadvantage of these application techniques is the great environmental pollution, e.g., due to the formation of spray mist which, due to the toxicological properties of the drugs, to some extent have considerable deleterious risks for men and animals. Furthermore, due to the processes applied, they require larger amounts of the drug, since a portion of the active substance applied does not reach the plant. Since an exact dosage of the active substance is not possible due to external influences, such as wind, rain, temperature and soil conditions, generally over-dosage results. In addition, these application techniques are partially connected with a considerable expenditure of work, since the treatment of some pests or pathogenic agents has to be repeated for several times during the course of a vegetative period.

Among the numerous attempts to develop new application systems and techniques to overcome the described disadvantages, the device for the transcuticular application of systemic drugs to plants according to DE-OS 37 23 380 is to be mentioned. This device consists of an active substance storing carrier having an area acting as contact layer to the plant surface, through which area active substance is released to the plant. The device which normally has an area of 1-20 cm$^2$, generally a thickness of 5-200 $\mu$m, and contains up to 200 mg of active substance, can be employed in the pest control, for nutrition purposes, or to influence the growth of plants of all genera in the house and garden. The device is applied to the leaves or stems of the plant, in order to permit a transition of the active substance from the active substance reservoir via the cuticula of the plant part to the plant itself. This device provides reduction of risks for men and animals, e.g., for useful insects, reduces the amounts of active substance to be applied compared with those of commercial techniques, and permits independence from influences during active substance release to plants caused by external factors, such as wind, rain, or sun.

However, the device described in DE-OS 37 23 380 can only partially avoid the disadvantages of the common techniques described above.

As is generally known, an intact cuticula is present only on green parts of the plant, such as, leaf organs, and on young parts of the plant, e.g., green stems or blossoms.

Plants some parts of which, e.g., the shoot axis or branches, exhibit a secondary thickness growth, shed the outer primary surface tissues, epidermis and cuticle, with increasing age and increasing lignification and substitute these by secondary surface tissues, such as secondary bark, cork, or outer bark.

These tissues which mainly exhibit sclerenchyma, i.e., have become hardened, and take over the physiological functions of epidermis and cuticle, have a rough and uneven surface.

However, in case of such surfaces which occur, e.g., at the trunk or branches of a tree, the device according to DE-OS 37 23 380 cannot develop the desired effect since, due to lack of layer thickness and deformability of the reservoir, it cannot adapt to the plant's surface in such a way that a close, as complete as possible contact with the surface of the plant is created which is absolutely essential for an optimal release of the active substance to the plant. The alternative, i.e., to employ the device according to the prior art to other plant parts covered with cuticula without secondary surface tissues, e.g., on the leaves, is of no use for plants with great volumes of distribution. On the one hand, the required active substance concentration is not achieved in all parts of the plants, on the other hand, if active substance is applied on one or even more leaves, the local active substance concentration at the site of application already is phytotoxic. In addition, further difficulties in the application arise for plants which have cuticula covered parts only at a height of some meters, and can thus only be reached with increased expense.

It is accordingly the object of the present invention to provide a device and a process for the treatment of plants which do not exhibit the disadvantages of the devices proposed in the prior art, and with the help of which systemic active substances can be released to plants of all kinds, all sizes, and any age, via plant surfaces with hardened, uneven superficial tissues.

This object is achieved by a device according to the features of the main claim. The device according to the present invention exhibits a back layer and an active substance reservoir which is deformable and adaptable to uneven surfaces so that in case of uneven, secondary and hardened surface tissues not being covered by a cuticle, an improved contact formation between active substance reservoir and plant surface, and thus an improved active substance transition into the plant, is permitted.

According to a preferred embodiment of the present invention the device is flexible as a whole so that application, even in case of an extreme flexion of the surface to be covered by the device, can easily be carried out. However, the device can also be rigid and may optionally exhibit a given curvature.

In any case, it is decisive for the application that construction, composition, and layer thickness of the reservoir are chosen in such a way that the release surface of the device intended to give the systemic active substance to the plant can be adapted to all kinds of uneveness at the site of application by simple pressing, and thus an all-over contact between release surface and absorbing surface can be achieved rapidly and without problems. The transfer of the active substance from the reservoir into the plant then takes place during the whole application period via the surfaces being in permanent contact with each other.

The selection of the composition of the reservoir is made in consideration of the intended purpose, however, in any case, in such a way that the release of the systemic drug to the plant via hardened and sclerenchyma-exhibiting surfaces of the plant not being covered by a cuticula can be performed.

In addition, it is of advantage that, even in case of large active substance amounts, the controlled release can be performed over a long period of time to a small surface by adequate selection of the composition and the layer thickness of the reservoir.

The term reservoir is used in the present application as a general term for all materials and parts of the device from which systemic active substance is released to the plant.

The special advantages of the device according to the present invention are its environmental acceptability, resistance to meteorological factors, e.g., rain or wind, avoidance of lasting damage to plants of any age, simple application, and cost-favourable production with known techniques.

The device according to the present invention can be employed with particular advantage in plants having secondary, indurated surface tissues, such as shoot axes and branches of plants, e.g., barks, covered tree trunks and stems of bushes.

The release of the systemic active substance from the reservoir and the absorption by the plant are performed in a series of partial steps and depend on various factors.

The systemic drug has to be contained in the reservoir in a form permitting the uptake into the plant. Kind, construction, and composition of the reservoir must have such a constitution that only a defined amount of substance per unit of time is released to the plant.

The substance absorption depends on the penetration of the substances into the epidermic and subepidermic tissue of the plant and of the transition of the substances into the substance transport systems of the plant.

The size of the contact surface between plant and device also influences the release and intake of the drug. In case of a given reservoir which releases a certain amount of substance per unit of time and area, the size of the device, and thus the contact surface of the reservoir to the plant, is adapted to the size and age of the plant, and in particular to the available volume of distribution.

The release rate depends on the kind, design, and composition of the reservoir, and on the thermodynamic activity of the active substance in the reservoir. When the formulation of the reservoir is chosen and the release rate adjusted, the dynamics and kinetics of the systemic active substances within the plant are to be taken into consideration first of all, i.e., the action of the systemic active substances, the minimum concentration of active substance necessary to achieve an action, the kind and velocity of distribution, as well as kind and rate of the biological decomposition of the active substance in the plant.

The active substance release from the reservoir to the plant is in any case controlled and regulated by the selection of an adequate reservoir in such a way that no cumulation of systemic active substance occurs in the plant, i.e., that the systemic active substance concentration in the plant always is above the efficiency limit and below that concentration at which phytotoxic effects may occur.

Systemic active substances which can be released to plants by means of the device according to the present invention are systemic pesticides, such as, e.g., systemic insecticides or systemic fungicides, or systemically effective growth controlling substances. Systemic fungicides, e.g., are triforine, aluminiumfosetyl, bitertanole, fenarimol, tridemorph, nuarimol, penconazol, or propiconazol.

Systemic insecticides, e.g., are nicotine, demeton and derivatives thereof, disulfoton, dimethoate, mevinphos, fenthion, menazon, aldicarb.

Systemic growth promoters, e.g., are auxins, gibberellins, or cytokinins.

Abscinic acid and ethylene are to be mentioned as examples of systemic growth inhibitors.

As is generally known, after application of commercial preparations, such as solutions, foams, or sprays, the cited systemic active substances can be resorbed by the plants, e.g., via the foliage or roots, and after resorption be transported in the conductive systems of the plant and systemically be distributed in the plant.

The reabsorption by the plant can take place by diffusion of the substance through the epidermis and subepidermic tissues and subsequent transition into the substance transport systems, or by direct release of active substance to the plant. After resorption, the active substance is at first distributed in the plant via the long-range transport systems xylem (water transport) and phloem (transport of assimilation product). Mainly hydrophilic active substances and ionic compounds are transported in the xylem, mainly lipophilic ones, however, within the phloem. The distribution of systemic active substances to the periphery and the central strand is performed by medium-range transport which takes place from cell to cell in the cell membranes, e.g., in case of radial transport in the medullary ray parenchyma, and by short-range transport, i.e., intra-cellular transport and transport through membranes.

A preferred embodiment of the present invention exhibits a reservoir of a lipophilic polymeric film comprising 1 to 80%-wt. of at least one elastomer, 0.5 to 50%-wt. of at least one softener, 0.5 to 50%-wt. of at least one systemic active substance, and 0.5 to 70%-wt. of auxiliaries. The reservoir is produced according to known methods from a solution, dispersion, or melt. As elastomers can be used, e.g., natural rubber, synthetic rubber, ethylene-vinyl-acetate-copolymers, styrene-butadiene-copolymers, blockcopolymers (e.g., styrene/butadiene/styrene, or styrene/isoprene/styrene), polyisobutylene, polyamide, polyester, polyacrylate, polymethacrylates, polyvinyl ether, polyvinyl ester, polychlorobutadiene, polyurethanes, polycaprolactams, polycaprolactons, cellulose derivatives, and silicones.

Suitable for the use as softeners are mineral oils, liquid polyisobutylenes, low-molecular polyethylene glycols, citric acid esters, tartaric acid esters, glycerol esters, phthalic acid esters, mono- or multivalent alcohols, fats, or waxes.

A further advantageous embodiment of the device according to the present invention exhibits a reservoir of a film-like hydrogel or a film-like, water-containing emulsion comprising 0.5 to 50%-wt. of at least one water-soluble or water-swellable polymer, 0.5 to 50%-wt. of at least one systemic active substance, 0.5 to 70%-wt. auxiliaries, and 1 to 80%-wt water.

As water-soluble or water-swellable polymers the following materials can be used, e.g., polyvinyl alcohols, polyvinyl acetate, polyvinyl pyrrolidone, polyacrylic acid and the derivatives thereof, polymethacrylic acid and the derivatives thereof, polyethlyene glycols, polypropylene glycol, cellulose derivatives, starch and starch derivatives, galactomannans, xanthene, guar derivatives, carrageen, alginates, pectins, gelatin, gum arabic.

All types of reservoir may comprise as auxiliaries the a.m. softeners, thickeners, and swelling agents, penetration accelerators, tackifiers, preserving agents, disinfectants, pH-regulators, antioxidants, emulsion stabilizers, cross-linking agents, fillers, and/or foam stabilizers.

In addition to the water-soluble or water-swellable polymers mentioned hereinabove, the reservoir may comprise as thickening and swelling agents, e.g., colloidal silicic acid, swell clays, mono- or disaccharides, such as glucose, fructose, lactose, maltose, and saccharose, or oligosaccharides, such as dextranes.

The absorption of systemic active substances by the plant is intensified by penetration accelerators. For this purpose, e.g., alkyl sulphates, alkyl sulphonates, alkali soaps, fatty acid salts of multivalent metals, betaines, amine oxides, fatty acid esters, mono-, di-, or triglycerides, long-chain alcohols, sulphoxides, nicotinic acid esters, salicylic acid, N-methylpyrrolidone, 2-pyrrolidone, or urea may be added.

The reservoir may comprise as tackifiers natural resins or gums, e.g., mastic, damar, elemi, styrax, euphorbium, sandarac, galbanum, gum arabic or karaya gum, modified natural resins, such as, e.g., colophony derivatives, or synthetic resins or gums, such as, e.g., polyacrylates, polymethacrylates, polyvinyl ethers, polyurethane, polyisobutylenes, polyvinylesters or silicones.

Preserving agents suitable to be added to the reservoir, e.g., are p-Cl-m-cresol, phenylethyl alcohol, phenoxyethyl alcohol, chlorobutanol, 4-hydroxybenzoic acid methyl ester, 4-hydroxybenzoic acid propyl ester and benzalkonium chloride, cetylpyridinium chloride, chlorhexedine diacetate or chlorhexedine digluconate, ethanol, or propylene glycol.

The following disinfectants may be addedd: halogen compounds, such as polyvidone-iodine, sodium hypochlorite or chloramine T; oxidants, such as hydrogen peroxide or potassium permanganate; aryl mercury compounds, such as phenyl mercury borate or merbromin; alkyl mercury compounds, such as thiomersal; organotin compounds, such as tri-n-butyl-tin benzoate; silver protein compounds, such as silver protein acetyltanate; alcohols, such as ethanol, n-propanol or isopropanol; phenols, such as thymol, o-phenylphenol, 2-benzyl-4-chlorophenol, hexachlorophen, or hexylresorcinol; or organic nitrogen compounds, such as 8-hydroxyquinoline, chlorquinaldol, clioquinol, ethacridine, hexetidine, chlorhexidine, or ambazone.

Suitable pH-regulators are glycine buffers, citrate buffers, borate buffers, phosphate buffers, or citric acid-phosphate-buffers.

The reservoir may comprise as antioxidants, ascorbic acid, ascorbic palmitate, tocopherol acetate, gallic acid ester, butylhydroxyanisole, or butylated hydroxytoluene.

Suitable emulsion stabilizers are non-ionogenic emulsifiers, such as, higher fatty alcohols, partial fatty acid esters, multivalent alcohols, partial fatty acid esters of sugars, polyethylene glycol fatty acid esters, polyethylene glycol fatty alcohol ether, polyethylene glycol-sorbitane-fatty acid ester; as well as amphoteric emulsifiers, such as phospholipides, ampholytic soaps; or proteins, cationic emulsifiers, such as quaternary ammonium compounds; or pyridinium compounds and anionic emulsifiers, such as fatty acid salts of multivalent metals, alkylsulphates, and alkyl sulphonates.

Micro crystalline cellulose, aluminum oxide, zinc oxide, titanium dioxide, talcum, silicon dioxide, magnesium silicate, magnesium aluminum silicate, kaoline, hydrophobic starch, calcium stearate, or calcium phosphate can be used as fillers.

The reservoir may comprise as cross-linking agents multivalent cations of metal, multivalent isocyanates, multivalent aldehydes, multivalent alcohols, multivalent carboxylic acids, or peroxides.

Reservoirs on the basis of lipophilic polymer films and emulsion films may additionally comprise as auxiliaries natural, semi-synthetic or synthetic fats and oils, such as, olive oil, castor oil, peanut oil, soy oil, linseed oil, sesame oil, jojoba oil, avocado oil, hydrogenated peanut oil, hydrogenated castor oil, triglyceride mixtures (Miglyol ®, Softisan ®), or silicone oils, natural, semi-synthetic or synthetic waxes, such as, bees wax, wool wax, earth wax, spermacti wax, oleic acid oleyl ester, isopropyl palmitate, isopropyl myristate, ethyloleate, cetyl palmitate or cetyl stearate; fatty alcohols, such as dodecyl alcohol or cetyl alcohol; fatty acids, such as myristic acid, oleic acid or linoleic acid; propoxylated, ethoxylated, or sulphated fatty alcohols, fatty acid alkylamides, fatty acid-protein-condensation products, phospholipides, sterols; or hydrocarbons, such as paraffins, or paraffin oils.

If a hydrogel or hydrous emulsion is used as reservoir, the permeability of the hardened superficial tissue to active substances is increased by swelling of the barrier layer conflicting the diffusion of the systemic active substance under occlusive action of liquid. This effect is even intensified, if auxiliaries, e.g., alkalis, effecting a quicker softening of the indurated superficial tissues, are added to the water or to the mixture of water and water-miscible solvents contained in the reservoir.

A further preferred embodiment of the device according to the present invention either comprises a reservoir having a porous structure, such as, e.g., a soft foam, a nonwoven fabric, a foamed dry gel, or the reservoir comprises a textile fabric on the basis of natural, semi-synthetic or synthetic fibers. The systemic active substance can be distributed in the relative reservoir in a dissolved, dispersed or emulsified form, or in the form of microcapsules.

It is possible, too, to manufacture the form of active substance reservoir capable of releasing active substances to the plant only immediately prior or during use. For example, systemic active substance may be contained in powdery state or in the form of a dried preparation in a reservoir exhibiting a porous structure or being a textile fabric.

Prior to application, a defined amount of liquid, which as well may contain auxiliaries, is applied on the reservoir, whereby the liquid is chosen in such a way that it is able to dissolve the active substance at least partially. This embodiment is particularly advantageous for active substances exhibiting a storage stability of less than two years when in dissolved form.

It is also possible to apply a defined amount of liquid, which comprises systemic active substance and optionally auxiliaries on the reservoir of the device shortly prior to application, whereby the reservoir exhibits a porous structure or is a texile fabric and may also comprise auxiliaries, such as gelling agents. The addition of liquid can be continued during application.

This is done by means of continuous infusion or intermittent infusion from a reserve container being positioned above the site of application through the backing layer into the reservoir; these infusion methods are known to the man skilled in the art from medical science. This embodiment of the device according to the present invention permits in advantageous manner the supply of large amounts of active substance over small areas during a long period of time. In addition, via adequate known dosage devices, the supply of systemic active substances can be adapted to changing requirements during the course of a vegetative period, and thus is regulated.

The active substance reservoir of the device may also be a multi-layer laminate, whereby at least one layer of the laminate comprises systemic active substance. In this connection, the above mentioned reservoir types may be joined to a multi-layer composite in desired combination.

In this connection, the individual composite layers may be interconnected and coherent, but they may also be divided into segments surrounded or enclosed by the relative upper or lower layer, e.g., in the form of storing element and surrounding release element.

In a multi-layer composite, a layer which is free from active substance or a porous foil may be positioned as controlling membrane between different layers or between reservoir and plant. The active substance reservoir may additionally comprise at least one separating element. The separated reservoir members may, for example, comprise the same active substance in different reservoir formulations. The different formulations may be designed in such a way that systemic active substance is released very rapidly from the one part in order to quickly achieve a sufficient active substance concentration within the plant, and that systemic active substance is released with delay from the other part in order to maintain the active substance concentration over the desired period of time. However, the different members of the reservoir may also comprise different active substances for the prophylaxis and treatment of various plant diseases. Due to the separation of the reservoir it becomes possible the optimum formulation for the release of each active substance can be applied separately.

The advantage of this embodiment lies in the fact that in all cases where several systemic active substances are to be applied for the protection of the plant, these active substances need not necessarily be applied simultaneously by means of several devices. By the provision of separating layers and the construction in separating elements it is additionally safeguarded that undesired interactions between different reservoir parts are avoided, and thus variations during storage are excluded.

Advantageously the complete contact surface of the device to the plant, but particularly the active substance reservoir, is protected by a cover prior to application; this covering may exhibit a pull-off aid in order to facilitate its removal when applied. In general, the backing layer of the device is formed so as to be resistant to exterior influences, such as water, heat, and air, and protect the reservoir from these influences.

Preferably backing layer and protective layer consist of foils from polyamide, polycarbonate, polyester, polyethylene, polypropylene, polyvinyl chloride, polyvinyl ester, polyurethane, polystyrole, polytetrafluoroethylene, cellophane, cellulose acetate, aluminum, or of composite foils of these materials.

Advantageously the backing layer may be printed, e.g., for identification or warning purposes.

According to a particular embodiment of the present invention the device, at least partially, is designed so as to rot. Thus removal of the device after application becomes superfluous, if the device rots away, e.g., by the action of UV-rays, or the action of biological decomposition, such as, action of microbes or enzymes. The measurements taken to make the device rot are determined in such a way that the decay of the device starts after termination of the intended period of application.

The attachment of the device to the plant can be performed by various manners. If the back layer and the active substance reservoir have the same surface dimensions, the composition of the deformable reservoir is preferably chosen so as to exhibit self-adhesive properties, whereby these properties at the same time have to ensure a high initial adherence and a high adhesive capacity over a wide temperature range in order to guarantee a safe adherence of the device on rough, uneven, and sometimes moist surfaces in case of high temperatures in summer and low temperatures in spring or late autumn. If the reservoir does not, or only to a small extent, exhibit self-adhesive properties, the device is applied to the plant, adapted to the surface of the plant by slight pressure, and subsequently fastened by means of conventional adhesive tapes, adhesive foils, bands or bandages by wrapping the plant part and the device.

It is preferred to attach the device in that the backing layer has larger area dimensions than the active substance reservoir and that at least the projecting portions of the backing layer facing the plant surface are rendered self-adhesive so as to effect the attachment of the device to the plant surface by these extending portions.

A further alternative is that the backing layer ends in two opposite, longish brackets or tapes which, after the device has been applied to the stem of a plant, are guided around the stem and tightly knotted. These brackets may also be provided with Velcro fasteners and designed in such a way that they can be interlocked with each other.

The device is preferably produced according to known methods and are individually finished. If backing layer, active substance reservoir, and optionally protective layer have the same dimensions, the devices may be stored in a container by rolling them up coherently in sheet form of folding them. The user may then separate segments having a surface appropriate for the intended use, e.g., by cutting. The area of the segments may also be predetemined by specific lines, e.g., by pre-punching or pre-cutting so that the applier can tear off individual segments without having to use technical auxiliaries.

The advantages of the device according to the present invention for the release of systemic active substances to plants become evident particularly in market gardening, such as, fruit farming and vine culture.

Pest control is of great importance in these fields, since pesticides in most cases have to be applied for serveral times during the course of a vegetative period.

Frequently, it is difficult to weigh economic aspects on the one hand against environmental protection and avoidance of risks for men and animal on the other hand, if pesticides have to be distributed according to conventional methods. This difficult situation is set aside, if the device according to the present invention is used—a single application within vegetative period permits that the required active substance amounts are released to the plant in a controlled manner such that a protection of the plant is effected prior to infest or, if the plant has already been infested, an effective pest control is possible over the whole vegetative period, thereby neither environmental pollution nor risks for men and animals occurr. In addition, considerable savings with respect to material and active substance are achieved, if the device according to the present invention is used, since the utilization of the active substance is by far more efficient than this is the case when conventional techniques are used. Moreover, no other auxiliaries need to be used. Furthermore, the expenditure of work for the plant protection is considerably reduced.

In order to illustrate the present invention FIGS. 1 to 6 are explained in the following:

Figure 1:
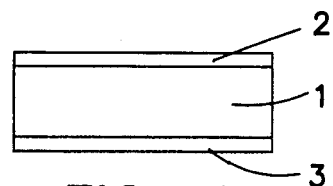
FIG. 1 shows a device in which the active substance reservoir (1) is provided on the one side with an impermeable backing layer (2) and on the opposite side with a removable, impermeable protective layer (3).
Figure 2:
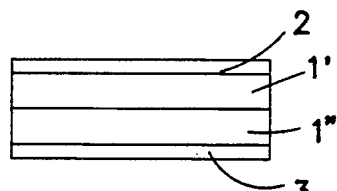
FIG. 2 represents a device with multi-layered active substance reservoir, whereby the reservoir is divided into two layers (1', 1'').
Figure 3:
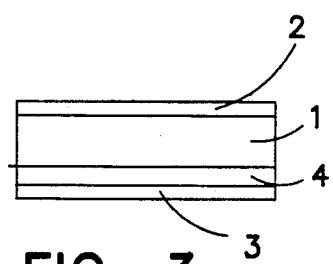

In the drawing shown in FIG. 3, the active substance containing reservoir (1) is combined with a controlling membrane (4) at the side facing the plant.

Figure 4:
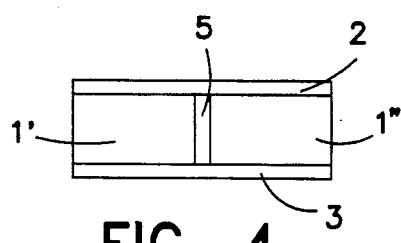

FIG. 4 represents an embodiment in which the active substance reservoir is divided into two parts (1', 1'') by a separating element (5).

Figure 5A:
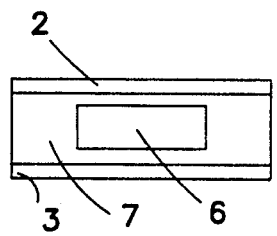
Figure 5B:
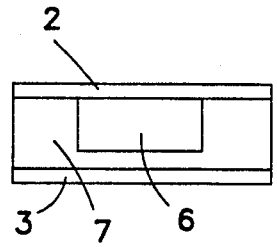

FIGS. 5a and 5b show devices with an active substance reservoir divided into segments, the active substance reservoir exhibiting a storing element (6) and a release element (7).

Figure 6A:
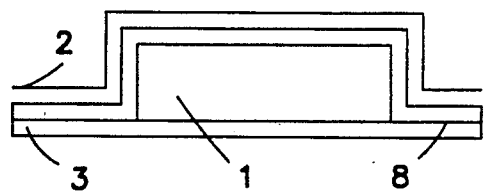
Figure 6B:
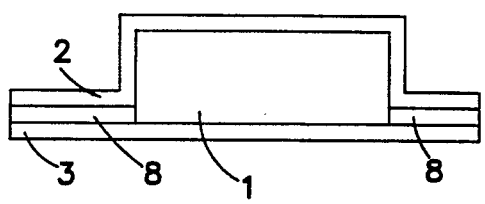

FIGS. 6a and 6b represent devices in which the active substance reservoir (1) is covered with a protective layer (3) and a backing layer (2). The layers (3) and (2) are of larger surface dimansion than the reservoir (1) and are completely (FIG. 6a) or partially (FIG. 6b) coated with an adhesive film (8).

The present invention will be further illustrated by the following examples:

EXAMPLE 1

75 g of an ethylene-vinyl-acetate-copolymer having a vinyl acetate fraction of 28%-wt. and a melt flow index of 800 (Evatene 28.800), 25 g of an ethylene-vinyl acetate-copolymer having a vinyl acetate component of 28%-wt. and a melt index of 25 (Evatane 28.25), 275 g hydroabietyl alcohol (Abitol), 7.25 g polyoxyethylene-(20)-stearylether (Brij 78), and 7.25 g polyoxyethylene-(2)-stearylether (Brij 72) are together molten up at 110° C.

In this melt 14.5 g of a cross-linked polyacrylic acid-sodium salt (Aquakeep 10 SH) and 173 g of a 25% wettable powder of bitertanole (Baycor) are dispersed. The melt is laminated onto a siliconized paper at a temperature of 70° C. and a coating weight of 1700 g/m$^2$ at a spread width of 20 cm. After cooling, the active substance reservoir film is centrally laminated onto the priviously adhesive-coated side of a browned, 42 cm wide polyethylene carrier foil (100 μm) being aluminized towards the adhesive layer in such a way that the adhesive coated carrier foil projects at both sides of the reservoir film by 11 cm. Subsequently, a siliconized covering having a width of 44 cm is laminated thereto so that the reservoir film and the projecting, adhesive portions of the carrier foil are covered.

At right angles to the running direction bands are cut off every 2 cm so that the dimensions are as follows: band 2×44 cm, carrier (backside covering) 2×42 cm, active substance reservoir 2×20 cm. The active substance reservoir has a thickness of approximately 2 mm and comprises 0.5 g bitertanole.

EXAMPLE 2

75 g polyvinyl pyrrolidone (Kollidon 30), 75 g gelatin, 50 g glycerol, and 1.5 g of an approximately 28% solution of various para-hydroxybenzoic acid esters in phenoxyethanol (Phenonip) are dissolved in 300 g distilled water at 70° C.

In this solution, 225 g of an approximately 75% powder concentrate of fosetyl-aluminum (Aliette) are dissolved or dispersed, respectively.

This mass is laminated onto a 20 cm wide nonwoven fabric (weight per area unit 80 g/m$^2$) at a temperature of 50° C. and an application weight of 1500 g/m$^2$ at a spread width of 20 cm. After cooling, the active substance reservoir laminate is centrally laminated with the uncoated nonwoven side on an adhesive-coated polyethylene carrier foil (corresponding to Example 1); it is covered with a siliconized foil (corresponding to Example 1), and individual strips are formed having the dimensions as those of Example 1. The active substance reservoir has a thickness of approximately 2 mm and comprises 1.4 g fosetyl-aluminum.

EXAMPLE 3

Devices free from active substances are produced analoguously to Example 2 (nonwoven fabric 40 cm$^2$ on adhesive covered polyethylene carrier foil 84 cm$^2$). The nonwoven pads are each impregnated with 4 g of a 12% emulsion concentrate of fenarimole (Rubigan), and the devices are covered with a siliconized foil. The devices according to Examples 1 to 3 comprise systemic fungicides, which, e.g., are used in apple trees for the treatment of scurf fungi.

In order to test the efficiency, the devices according to Examples 1 to 3 and corresponding placebo devices, which were free from active substances, were applied to one year old apple trees, class Gloster, in spring time at beginning terminal bud activity to the trunk just above the graft site by wrapping tham about the trunk.

Some trees remained untreated for comparison purposes. The efficiency was evaluated after two and six months on the basis of the degree of fungal attack and the germination of the fungi (number of leaves with scab stains, number of crust stains per leaf) and compared to those trees which were not treated. In order to evaluate possible phytotoxic properties the number of leaves were determined as criterion for the shooting.

A significant protection of the trees could be achieved at the trees treated with the devices according to Examples 1 to 3 compared with those treated with the placebo devices and those which remained untreated. The trees treated with the devices according to Example 1 to 3 exhibited only isolated scurf stains even after a treatment of 6 months; those treated with devices according to Example 2 were free from scurf infest, while the untreated and placebo treated trees exhibited severe fungal attack at more than 50% of their leaves.

Phytotoxic symptoms were observed in isolated cases at trees which had been treated with devices according to Example 2.

The number of leaves in case of these trees was by approximately 15 to 20% below the values obtained for those trees treated with devices according to Examples 1 and 3, the placebo-treated and the untreated ones.

It is understood that the specification and examples are illustrative but not limitative of the present invention and that other embodiments within the spirit and scope of the invention will suggest themselves to those skilled in the art.

We claim:

1. A device for the release of systemic active substances to plants through plant surfaces which consist of secondary, hardened superficial tissues not being covered by a cuticula, said device consisting of a backing layer and a polymer-containing active substance carrier acting as contact layer to the surface of the plant, characterized in that the device has a deformable active substance reservoir being adaptable to uneven surfaces, which reservoir, in addition to other auxiliary agents, contains penetration accelerators altering the secondary, hardened superficial tissues of the plant surface in such a way that said tissues become permeable to active substances.

2. The device according to claim 1 wherein the penetration accelerators are selected from the group consisting of alkyl sulfates, alkyl sulfonates, alkali soaps, fatty acid salts of multivalent metals, betaines, amine oxides, fatty acid esters, mono-, di-, and triglycerides, long-chain alcohols, sulfoxides, nocotinic acid esters, salicylic acid, N-methylpyrrolidone, 2-pyrrolidone, urea, water and aqueous alkali solutions.

3. The device according to claim 1 wherein the reservoir comprises
   a) 1 to 80%-wt. of at least one elastomer,
   b) 0.3 to 50%-wt. of at least one softener,
   c) 0.5 to 50%-wt. of at least one systemic active substance, and
   d) 0.5 to 70%-wt. of auxiliary agents.

4. The device according to claim 1, wherein the reservoir comprises
   a) 0.5 to 50%-wt. of at least one water-soluble or water-swellable polymer,
   b) 0.5 to 50%-wt. of at least one systemic active substance,
   c) 0.5 to 70%-wt. auxiliaries, and
   d) 1 to 80%-wt. water.

5. The device according to claim 1 wherein the reservoir comprises a porous structure or a textile fabric in which systemic active substance is distributed.

6. The device according to claim 1 wherein the systemic active substance, optionally in the form of a preparation, is applied in or to the reseroir only immediately prior to or during the application.

7. The device according to claim 1 wherein the reservoir is a laminate of several layers, whereby at least one layer contains systemic active substance.

8. The device accoording to claim 1 wherein the reservoir comprises a separating element, particularly a controlling element in the form of a membrane.

9. The device according to claim 1 being at least partially rottable.

10. The device according to claim 1 wherein the contact surface of the active substance reservoir to the plant is protected by a covering prior to application.

11. The device according to claim 1 wherein the systemic active substances are pesticides, insecticides, fungicides, or growth influencing substances.

12. The device according to claim 1 wherein the backing layer which is impermeable to active substances is printed.

13. A method for the treatment of a plant having an uneven surface of secondary, hardened superficial tissues which are not covered by a cuticula, which comprises applying to such secondary superficial tissues a device consisting of a backing layer and a polymer-containing active substance carrier acting as contact layer to the surface of the plant, the device having a deformable active substance reservoir adaptable to the uneven surface of the plant, the reservoir containing active substance and a penetration accelerator which alters the secondary, hardened superficial tissues of the plant surface in such a way that such tissues become permeable to the active substance.

* * * * *

UNITED STATES PATENT AND TRADEMARK OFFICE
CERTIFICATE OF CORRECTION

PATENT NO. : 5,162,052

DATED : November 10, 1992

INVENTOR(S) : Hoffmann et al.

It is certified that error appears in the above-identified patent and that said Letters Patent is hereby corrected as shown below:

Title Page      [75] Inventors:   3rd Inventor delete " Muleer " and substitute -- Muller --

Col. 11, line 25    Delete " nocotinic " and substitute -- nicotinic --

Signed and Sealed this

Fifteenth Day of March, 1994

Attest:

BRUCE LEHMAN

*Attesting Officer*     *Commissioner of Patents and Trademarks*